June 19, 1973 W. L. GOFFE 3,740,223
MIGRATION IMAGING STRUCTURE
Filed May 1, 1967

INVENTOR
WILLIAM L. GOFFE
BY
Owen D. Marjama
James J. Ralabate
ATTORNEYS

United States Patent Office 3,740,223
Patented June 19, 1973

3,740,223
MIGRATION IMAGING STRUCTURE
William L. Goffe, Webster, N.Y., assignor to Xerox Corporation, Rochester, N.Y.
Continuation-in-part of application Ser. No. 460,377, June 1, 1965, now Patent No. 3,520,681, which is a continuation-in-part of application Ser. No. 403,002, Oct. 12, 1964, now abandoned. This application May 1, 1967, Ser. No. 635,256
Int. Cl. G03g *5/00*
U.S. Cl. 96—1.5 23 Claims

ABSTRACT OF THE DISCLOSURE

An imaging structure comprising a supporting substrate, an overlayer of softenable material overlying said substrate, and a layer of particulate photosensitive material embedded at the upper surface of said softenable material.

CROSS-REFERENCE TO RELATED APPLICATIONS

This application is a continuation-in-part of U.S. patent application Ser. No. 460,377, filed June 1, 1965, now U.S. Pat. 3,520,681, and of U.S. patent application Ser. No. 403,002, filed Oct. 12, 1964, now abandoned. Application Ser. No. 460,377 is also a continuation-in-part of application Ser. No. 403,002.

BACKGROUND OF THE INVENTION

This invention relates in general to imaging, and more specifically, to an improved imaging system.

There has been recently developed a migration imaging system capable of producing high quality images of high density, continuous tone, and high resolution. This system is described and claimed in the above mentioned copending application Ser. No. 403,002. In a typical embodiment of this imaging system, an imaging structure comprising a conducting substrate with a layer of softenable or soluble material, containing photosensitive particles overlying the conductive substrate is imaged in the following manner: An electrostatic latent image is formed on the photosensitive surface, e.g., by uniform electrostatic charging and exposure to a pattern of activating electromagnetic radiation. The softenable layer is then developed by exposing the plate to a solvent which dissolves only the soluble layer. The photosensitive particles which have been exposed to radiation migrate through the softenable layer as it is softened and dissolved, leaving an image on the conductive substrate conforming to a negative of the original. This known as a positive-to-negative image. Through the use of various techniques, either positive-to-positive or positive-to-negative images may be made depending on the materials used and the charging polarities. Those portions of the photosensitive layer which do not migrate to the conductive substrate may be washed away by the solvent with the softenable layer.

The migration imaging process comprises a combination of process steps which include charging, exposing, and developing with a solvent. The characteristics of these images are dependent on such process steps as potential, exposure, and development, as well as the particular combination of process steps. High density, continuous tone and high resolution are some of the photographic characteristics possible. The image is characterized as a fixed or unfixed photoconductive powder image which can be used in a number of applications such as microfilm, hard copy, optical masks, and stripout applications using adhesive materials. Alternative embodiments of this concept are further described in the above cited applications.

In a related imaging system described in copending U.S. patent application 483,675, filed Aug. 30, 1965, non-photosensitive particulate material is used to form images in the migration imaging mode already defined above. In this system, a developable image is formed by charging in image configuration through the use of a mask or stencil. This image is then developed in a solvent for the softenable material.

In another recently developed imaging system, an image is formed by the selective disruption of a particulate material overlying an electrostatically deformable film or layer. The imaging structure used in this system is substantially the same as that used in migration imaging already described above, and involves exposing the charged member to an optical image to selectively relocate the charge and form a developable charge pattern. The softenable layer is then developed or softened by heat whereupon the particulate layer is selectively disrupted resulting in a rearrangement of the particles to form an image viewable by reflected or transmitted light. When the structure is developed by heat, the photosensitive area or layer is disrupted and the photosensitive particles are thereby selectively rearranged to change the optical properties of the plate. The image is believed to be formed because the photosensitive particles drift on top of one another and accumulate in valleys or pockets of the deformation image leaving the raised portions of the image uncovered. This imaging system is believed to be substantially due to a surface disruption effect with no substantial migration of the photosensitive particles within the softenable layer. This final image differs from that for migration imaging described above, in that the softenable layer is deformed in conjunction with a disruption of the photosensitive particles. This system is described and claimed in application Ser. No. 520,423, filed on Jan. 13, 1966, now abandoned.

Another related imaging system comprises exposing a migration imaging structure to a solvent vapor to form a migration image at the substrate composed of photosensitive particles, followed by heating said structure, whereby a high density image having low background is produced. This system is described and claimed in copending application Ser. No. 612,122, filed on Jan. 27, 1967. If desired, the migration image formed above may be utilized as a separate image without resorting to the heating step.

In general, two basic migration imaging structures may be used: A layered configuration which comprises a substrate coated with a layer of softenable material, and an overcoating of photosensitive material (usually particulate) embedded at the upper surface of the softenable layer, and a binder structure in which the photosensitive particles are uniformly dispersed throughout a softenable layer which overcoats a substrate.

An advantage of the layered configuration described above, is its complete versatility in being able to function admirably in all of the imaging systems described in the copending applications mentioned above. In addition, recent advances in the combination of materials, process or development techniques, and a better understanding of the theory of migration-type imaging has led to the development of superior layered configurations which yield outstanding imaging results.

SUMMARY OF THE INVENTION

It is, therefore, an object of this invention to provide a novel imaging structure.

It is a further object of this invention to provide a novel imaging structure having a layered configuration.

It is another object of this invention to provide a novel imaging structure for migration imaging systems.

The following objects and others are accomplished in accordance with this invention providing a novel imaging structure which comprises a substrate overcoated with a layer of softenable or soluble material containing an overlayer of photosensitive particles embedded at the upper surface of the softenable layer. These plates may be imaged by any conventional migration-type imaging procedure such as those defined in the above mentioned copending applications. The procedures usually involve charging and exposure, followed by development in a suitable solvent, or by heat. In order that high quality images having consistent reliability be formed, using the above named processes, it is essential that the combination of the various materials such as softenable layers, developer solvents, and photosensitive materials be combined or matched with regard to electrical, chemical, and physical properties, in order that the desirable images may be obtained.

The advantages of this improved structure system will become apparent upon consideration of the following disclosure of the invention; especially when taken in conjunction with the accompanying drawings wherein:

BRIEF DESCRIPTION OF THE DRAWINGS

Referring to FIG. 1, there is shown a schematic drawing of an example of one embodiment of this invention comprising an imaging plate 10 having a conductive substrate 11, overcoated with a softenable material 12 which contains at its upper surface a particulate layer of photosensitive material 13.

Figure 1A:
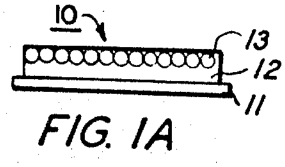
FIG. 1A shows on embodiment of an imaging plate as contemplated by this invention.

The conductive substrate 11 may comprise any suitable electrical conductor. Typical substrates are copper, brass, aluminum, steel, cadmium, silver, and gold. The substrate may be in any form such as a metallic strip, sheet, coil, cylinder, drum, or the like. If desired, the conductive substrate may be coated on an insulator such as paper, glass or a plastic. One example of this type of substrate comprises NESA glass, which is a partially transparent tin oxide coated glass available from Pittsburgh Plate Glass Co. Another typical substrate comprises aluminized Mylar which is made up of a Mylar polyester film of the E. I. du Pont de Nemours Co., Inc. having a thin semi-transparent aluminum coating. Another typical substrate comprises Mylar coated with copper iodide.

A dielectric or non-conductive substrate may also be used. This may be accomplished by placing the dielectric substrate in contact with a conductive member and charging. Alternatively, other methods known in the art of xerography for charging xerographic plates having insulating backings may be applied. For example, the plate of FIG. 1 may be moved between two corona charging devices and raised to opposite potentials to cause the desired charging to be effected. The applied charging potentials for the structures of this invention range from a few volts up to 400 volts or more.

The softenable plastic layer 12 may be any suitable material which is softened in a vapor solvent, or heat, and in addition, is substantially electrically insulating during the imaging and developing cycle. Materials falling within this definition include amorphous organic glasses such as Staybelite Ester 10, a partially hydrogenated rosin ester, Foral Ester, a hydrogenated rosin triester, both available from the Hercules Powder Co., and sucrose benzoate, available from Eastman Chemical Co.; alkyd resins such as Neolyne 23, an alkyd resin available from Hercules Powder Co.; epoxy resins such as Araldyte 606 and 6071, available from Ciba, and Epon 1001, a bispenol A-epichlorohydrin epoxy resin, available from Shell Chemical Corp.; and other materials such as hydrogenated Piccopale 100, a highly branched polyolefin resin produced by the polymerization of unsaturates derived from the deep cracking of petroleum, available from Pennsylvania Industrial Chemical Co.; Velsicol X-37, a polystyrene-olefin copolymer available from Velsicol Chemical Corp.; and Piccodiene 2215, a polystyrene-olefin copolymer, available from Pennsylvania Industrial Chemical Co.

In general, the softenable or soluble layer should be from about ½ to 16 microns in thickness, and may be prepared by any suitable technique. Typical methods of preparation include dip coating, roll coating, draw coating, or pour coating; with better control and more uniform results being obtained with dip and roll coating techniques. If the softenable layer is thicker than about 16 microns the photosensitive particles have difficulty in migrating to the substrate, and result in non-uniform images having poor resolution. Thicknesses below about ½ micron are difficult to fabricate, and in general, produce poor images. Thicker layers generally requiring a greater potential for charging, and in general, a thickness from about 1 to 5 microns has been found to yield particularly good results.

The above group of materials is not intended to be limiting, but merely illustrative of materials suitable for the softenable plastic layer.

The typically particulate overcoating of photoconductive material, or any other migration marking material, may be referred to as a "fracturable" layer of material. Fracturable layer as used herein refers to any migration layer and specifically the migration layer forms disclosed herein and those layers comprising discrete particles and those comprising apparently more mechanically continuous layers with a microscopic network of lines of mechanical weakness or which are otherwise fracturable and not completely mechanically coherent in the process hereof, which in the imaging member configurations hereof and their equivalents; in response to electrical charging, imagewise exposure to activating radiation and softening are caused to selectively deposit in image configuration on a substrate. Such fracturable layers are typically contiguous the upper surface of the softenable layer and may be coated onto, or slightly, partially, substantially, or completely embedded in the softenable material at the surface of the softenable layer.

The material comprising layer 13 may consist of any suitable inorganic or organic photosensitive material. Typical inorganic materials are vitreous selenium, vitreous selenium alloyed with arsenic, tellurium, antimony or bismuth, etc.; cadmium sulfide, zinc oxide, cadmium sulfoselenide and many others. U.S. Pat. 3,121,006 to Middleton et al. sets forth a whole host of typical inorganic pigments. Typical organic materials are: Watchung Red B, a barium salt of 1-(4′-methyl-5′-chloroazobenzene-2′-sulfonic acid)-2-hydrohydroxy - 3 - naphthoic acid, C.I. No. 15865, available from du Pont; Indofast double scarlet toner, a Pyranthrone-type pigment available from Harmon Colors; quindo magenta RV–6803, a quinacridone-type pigment available from Harmon Colors; quinacridones, such as Monastral Red B (E. I. duPont), Cyan Blue, GTNF the beta form of copper phthalocyanine, C.I. No. 74160, available from Collway Colors; Monolite Fast Blue GS, the alpha form of metal-free phthalocyanine, C.I. No. 74100, available from Arnold Hoffman Co.; Diane Blue, 3,3′-methoxy-4,4′-diphenyl-bis(1″ azo-2″ hydroxy - 3″ - naphthanilide), C.I. No. 21180, available from Harmon Colors; and Algol G.C., polyvinyl carbazole, 1,2,5,6-di (D,D′-diphenyl)-thiazole-anthraquinone, C.I. No. 67300, available from General Dyestuffs. The above list of organic and inorganic photosensitive materials is illustrative of some of the typical materials, and should not be taken as a complete listing.

The photosensitive particles of layer 13, may be formed by any suitable method. Typical methods include vacuum evaporation; cascading the material while being carried on glass beads or other suitable carrier over the soluble layer 12 which has been softened by a solvent vapor and/ or heat; liquid development techniques; powder cloud development techniques; by slurry coating techniques; or by simply dusting the particles of photosensitive material over the slightly softened soluble material.

In addition to the configuration shown in FIG. 1, additional modifications in the layered structure are also included within the scope of this invention. One such modification includes an overcoated layered structure in which a layer of photosensitive particles is sandwiched between two or more layers of the softenable material which overlie the conductive substrate.

The thickness of the particulate layer and size of the photoconductive particles is usually less than about one micron, with the particle size ranging from about 0.01 to 2.0 microns. Particles, larger than about 2.0 microns, do not yield optimum resolution and also show a reduction in image density compared to images having particles less than about 2.0 microns.

Figure 1B:
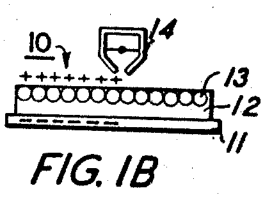
FIG. 1B shows electrostatically charging the plate of FIG. 1A.
Figure 1C:
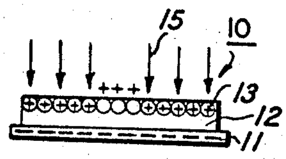
FIG. 1C shows exposing the charged plate of FIG. 1B.
Figure 1D:
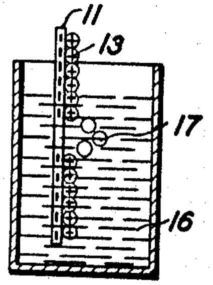
FIG. 1D shows developing the exposed plate of FIG. 1C with a liquid solvent.
Figure 1E:
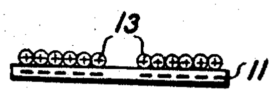
FIG. 1E shows the developed plate of FIG. 1D.

The structure of plate 10 of FIG. 1A may be imaged by uniformly electrostatically charging the surface with a corona charging unit 14 such as illustrated in FIG. 1B. The charged plate is then exposed to a pattern of activating radiation 15 as shown in FIG. 1C. The plate is then developed in a liquid solvent 16, which dissolves the softenable or soluble layer 12 and washes away the photosensitive particles 17 in the areas unexposed to radiation. A final image comprising photosensitive particles 13 adhering in image configuration on the conductive substrate is shown in FIG. 1E.

The developer solvent 16, may consist of any suitable liquid or vapor in which the softenable soluble layer dissolves, while leaving uneffected on the supporting substrate the photosensitive material in the form of the original image. The only requirement of the solvent is that it be a solvent for the softenable layer only, and that it be substantially electrically insulating in the sense that the charged image is not discharged electrically by exposure to the solvent. The maximum time of exposure to the solvent is in no way critical, inasmuch as the substrate and photosensitive material are selected so as to be substantially insoluble during development. In general, a few seconds of immersion in the solvent is more than sufficient to soften or dissolve the softenable plastic. Typical solvents are Freon TMC, available from du Pont; trichloroethylene, chloroform, ethyl ether, xylenes, dioxane, benzene, toluene, cyclohexane, 1,1,1-trichloroethylene, pentane, n-heptane, Odorless Solvent 3440 (Sohio), Freon 113, available from du Pont; m-xylene, carbon tetrachloride, thiophene, diphenyl ether, p-cymene, cis-2,2-dichloroethylene, octanol, ethyl acetate, methyl ethyl ketone, ethylene dichloride, methylene chloride, 1,1-dichloroethylene, trans 1,2-dichloroethylene, and super naphtholite (Buffalo Solvents and Chemicals).

In another embodiment, the photoconductive particles 13 of FIGS. 1A–1E, may be replaced with non-photosensitive particles which are conductive or insulating. Typical materials for these particles include carbon black, garnet, iron oxide, and insoluble dyes. With the exception of utilizing a non-photosensitive material, and charging through a mask, stencil, or using a shaped electrode, etc., the method and materials are the same as for the imaging sequence shown in FIGS. 1A–1E described above. As already stated above, copending application Ser. No. 483,675 specifically discloses and claims this method with other alternative embodiments and parameters.

DESCRIPTION OF THE PREFERRED EMBODIMENTS

The following examples specifically define the present invention with respect to a method of preparing a layered imaging plate. The parts and percentages in the disclosure, examples, and claims are by weight unless otherwise indicated. The examples are intended to illustrate the various preferred embodiment of the developing technique.

Example I

An imaging plate or film such as that illustrated in FIG. 1A is prepared by first making a mixture of 20% by weight of Staybelite Ester 10 (a 50% hydrogenated glycerol rosin ester of the Hercules Powder Co.), dissolved in a solution of toluene. Using a gravure roller, the mixture is then roll coated onto a 3 mil Mylar polyester film (E. I. du Pont de Nemours Co., Inc.) having a thin semitransparent aluminum coating. The coating is applied so that when air dried for about 2 hours to allow for evaporation of the toluene, an imaging plate comprising a two micron layer of Staybelite Ester is formed on the aluminized Mylar. A thin layer of particulate vitreous selenium approximately 0.5 micron in thickness is then deposited onto the Staybelite surface by inert gas deposition utilizing the process set forth in patent application Ser. No. 423,167, filed on Jan. 4, 1965, now abandoned.

Example II

An imaging plate or film is made accordingto the method set forth in Example I in which the Staybelite Ester is replaced with a 20 weight percent mixture of HP–100, a highly branched polyolefin, dissolved in toluene, with the final plate comprising a thin layer, 0.5 micron thick, of particulate vitreous selenium contained in the upper surface of the HP–100 on aluminized Mylar.

Example III

A strip of aluminized Mylar consisting of a 75 micron layer of Mylar overcoated with a submicron layer of aluminum, which has a 2 micron roll-coated overlayer of a softenable plastic Staybelite 10 thereon, is fixed to the bottom of a rectangular 2 by 6 by 4 inch brass container. The container is rotated about its horizontal axis and cascaded with a "developer" mixture of .12 gram of Florence Green Seal zinc oxide particles dyed with .03 gram of Rhodamine B per 8 grams of zinc oxide, and 50 grams of 50 micron diameter glass beads. The "developer material" consisting of carrier beads and zinc oxide particles, is cascaded over the aluminized Mylar strip held to the bottom of the container for 10 rotations or cascades. The strip is removed from the container and heated to 80° C. for two minutes, re-fixed in the container, and cascaded again. This cycle is repeated 6 times after which a zinc oxide layer has been formed with the zinc oxide particles dispersed approximately half way through the upper thickness of the softenable Staybelite plastic.

Example IV

An imaging plate such as that shown in FIG. 1 is made by roll-coating a sheet of aluminized Mylar polyester film (Du Pont) with a layer of Piccotex 100 (Penn. Industrial Chem. Co.) about 2 microns thick. A mixture of air spun graphite particles (Type 200–19, Joseph Dixon Crucible Co.) and 50 micron glass beads is then cascaded across the surface of the resin layer to form a carbon particle layer about 1 micron in thickness.

Example V

A 2 micron Piccotex 100 coating on 5 mil aluminium was charged by two passes under a Corotron set at 300 volts. Spray-dried particles (3 microns average diameter) consisting of a 50% mixture of Monastral Red B (from du Pont) in polyvinyl carbazole was placed in a DeVelbess #15 Atomizer. The fine power was sprayed on the plastic coating until a layer of suitable density about 1 micron thick was obtained.

Example VI

The spray dried Monastral Red B in polyvinyl carbazole mixture described above was mixed with glass carrier beads (250 microns dia.), a Piccotex 100 coating was formed by cascading the "developer" described above over the coating (about 6 passes). The coating was removed from the developing chamber, heated briefly to fuse the particles in the plastic, and then excess particles were removed by high pressure air stream.

Example VII

Commercial indigo powder (National Aniline Co.) was ground (wet, in cyclohexane) to a particle size of about 1 micron. The slurry was gravure coated on aluminized Mylar. After the solvent evaporated, the indigo was transferred by pressure to a 2 micron Staybelite 10 surface to form a layer about 2 microns thick.

The softenable or matrix layer 12 has the function of holding the photosensitive toner particle in place during charging and imagewise exposure and, upon suitable development, allowing the photoconductive toner particle to selectively migrate, by electrostatic forces, to the substrate. Therefore, the most important criteria for this layer is its ability to dissolve in solvents of relatively low dielectric constant, e.g., pentane, cyclohexane, carbontetrachloride, toluene, Freon, etc. In order to obtain optimum imaging results, the matrix or softenable layer, and developer solvent should be matched to obtain the best combination of electrical, chemical, and physical properties. Using, for example, particulate vitreous selenium as the photosensitive material, various combinations of matrix material and solvent developer were tested for image quality. The imaging plates or films were of the type prepared in Examples I–II, and were imaged in the imaging mode defined in FIGS. 1A–1E of the drawings.

For the layered configuration of this invention, selenium represents a preferred photosensitive material inasmuch as it yields outstanding image quality. The selenium is normally formed by vacuum deposition as set forth in application Ser. No. 423,167, now abandoned. For optimum imaging results using selenium, the softenable material should allow the selenium to be formed or deposited in a particulate layer slightly within the surface of the softenable layer. Particualte layers on or partially in the plastic do not give optimum imaging results. To yield optimum imaging results when using selenium, the softenable plastic layer should have a softening range of at least about 10° C.; an initial softening point of less than about 90° C.; and a surface melt viscosity at deposition in the range of about $10^4$ to $10^9$ poise. All of the softenable materials previously defined, can be included with the critical parameters defined above.

A series of 7 plates are made by the method of Example I using a matrix of Piccotex 100, with a 0.5 micron layer of selenium. These plates are developed in 7 different solvents and the image quality noted in Table I below.

TABLE I

| Matrix | Solvent | Image quality |
|---|---|---|
| Piccotex 100 | Freon 113 | High background. |
| Do | Cyclohexane | Do. |
| Do | Carbon tetrachloride | Some background. |
| Do | Tolune | Good image, slight background |
| Do | Trichloroethylene | Excellent image. |
| Do | Chloroform | No image. |
| Do | Ethylene dichloride | Do. |

It can be seen that Piccotex 100 resin produces images in 5 of 7 plates, but the quality of the images varies depending upon the solvent.

A series of 5 additional plates are then made by the method of Example I with 5 different matrix materials, and developed in a single solvent (toluene). As shown in Table II below, images of varying quality are produced in 3 of 5 plates.

TABLE II

| Matrix | Solvent | Image quality |
|---|---|---|
| Piccotex 100 | Toluene | Some background. |
| HP-100 | do | Good image. |
| Foral ester | do | Do. |
| Staybelite g | do | Do. |
| Neolyne 23 | do | No image. |
| Ethyl cellulose | do | Do. |

Further investigation of the properties of the matrix-developer pairs shows that the best images are definitely obtained from pairs that have low solution viscosity regardless of the conductivity of the pair. The correlation of image quality and viscosity is illustrated in Table III.

TABLE III

| Matrix | Solvent | Viscosity | Image quality |
|---|---|---|---|
| Staybelite | Toluene | Low | Excellent. |
| HP-100 | do | do | Do. |
| Piccotex 100 | do | do | Excellent to good. |

An attempt was made to relate the rate at which the developer solvent dissolves the matrix layer to the quality of the obtained image. It was found that where the rate of solution is high, the image was surprisingly much better.

| Matrix | Solvent | Rate of solution, μ/sec. | Image |
|---|---|---|---|
| Piccotex 100 | Cyclohexane | 1.5 | Background. |
| Do | Tolune | 3.6 | Good. |
| Do | Trichloroethylene | 6.6 | Excellent. |

The conductivity, viscosity, and rate of solution were measured as follows:

Conductivity.—measured using a Fluke impedance bridge and a conductivity cell with an area to length ratio of 5 cm.

Viscosity.—measured using 50 weight percent solutions of matrix material in developer using a Brinkmann Instrument Co. Rotovisco Model #651006.

Melt viscosity.—measured by the method of Pocklington (ref.—H.C. Pocklington, Proc. Cambridge Phil. Soc. 36, 507, 1940).

Rate of solution.—measured at room temperature, determined concentration of matrix vs. time of a developer solvent in contact with matrix palstic. The exposed area is kept constant.

In summary, a preferred range of matrix layer-developer solvent compositions having properties falling within the following limits was determined:

(1) A narrow conductivity range of $10^8$–$10^{10}$ ohm-cm.;

(2) Low solution viscosities, generally less than about 100 poise at a shear rate of 0.15 $sec.^{-1}$ for liquid solvents and from about 3 to 30 poise for vapor solvents.

(3) Solubilize at a rate greater than about 1.0 micron sec.

The above three parameters for conductivity, viscosity, and solubility apply to all photoconductors, and represent a preferred range of properties which may be used to obtain optimum imaging results.

Although specific components and proportions have been stated in the above description of the preferred embodiment of this invention, other suitable materials and procedures such as those listed above may be used with similar results. In addition, other materials and changes may be utilized which synergize, enhance, or otherwise modify applicants' novel layered structure.

Other modifications and ramifications of the present invention would appear to those skilled in the art upon reading this disclosure. These are intended to be within the scope of this invention.

What is claimed is:

1. An imaging structure comprising
a supporting substrate,
a layer of substantially electrically insulating softenable material overlying said substrate,
and a layer consisting essentially of particulate material, said particulate material comprising selenium, wherein said particulate material is substantially uniformly distributed across the surface area to be imaged, and said particulate material is embedded at the surface of said softenable layer spaced apart from the substrate-softenable layer interface of said softenable layer whereby said particulate material is mechanically attached to the softenable material, and said softenable layer is otherwise substantially void of particles, and said softenable material is softenable by at least one medium which does not substantially degrade the particulate material.

2. The structure of claim 1 wherein the substrate is electrically conductive.

3. The structure of claim 1 wherein the softenable layer is of a thickness in the range between about ½ and about 16 microns.

4. The structure of claim 3 wherein the softenable layer is of a thickness in the range between about 1 and about 5 microns.

5. The structure of claim 1 wherein the softenable material has a solution viscosity less than about 100 poise at a shear rate of about 0.15 $second^{-1}$ in a developing solvent.

6. The structure of claim 5 wherein the softenable material has a rate of solution in a developing solvent greater than about 1.0 micron/sec.

7. The structure of claim 1 wherein the softenable material comprises a copolymer of styrene and vinyl toluene.

8. The structure of claim 1 wherein the softenable material comprises a partially hydrogenated rosin ester.

9. The structure of claim 1 wherein the selenium comprises vitreous selenium.

10. The structure of claim 1 wherein the softenable material has a softening range of breadth of at least about 10° C., and an intial softening point of less than about 90° C., and a surface melt viscosity capable of being controlled in the range of about $10^4$ to $10^9$ poise.

11. The structure of claim 1 wherein the particulate material comprises an alloy of vitreous selenium and at least one element selected from the group consisting of arsenic, tellurium, antimony, bismuth, and mixtures thereof.

12. The structure of claim 1 wherein particulate material comprising selenium is of a size not greater than about 1 micron.

13. The structure of claim 1 wherein the layer of particulate material comprising selenium is of a thickness not greater than about 1 micron.

14. The structure of claim 1 wherein the softenable material comprises at least one material selected from the group consisting of polyolefins, styrene-olefin copolymers, phenolic resin, and mixtures thereof.

15. The structure of claim 1 wherein said layer of particulate material comprises a layer of a thickness not greater than about 1 particle diameter.

16. The structure of claim 1 wherein the layer of particulate material consists essentially of particles which are completely embedded in said softenable layer at the surface of said softenable layer spaced apart from the substrate-softenable layer interface.

17. The structure of claim 1 wherein the softenable material comprises an organic amorphous glass.

18. The structure of claim 1 wherein the particulate material comprising selenium is of a particle size in the range between about 0.01 and about 2.0 microns.

19. The structure of claim 18 wherein the particulate material comprises an alloy of vitreous selenium and at least one element selected from the group consisting of arsenic, tellurium, antimony, bismuth, and mixtures thereof.

20. The structure of claim 18 wherein the softenable layer is of a thickness in the range between about ½ and about 16 microns.

21. The structure of claim 16 wherein the softenable material comprises at least one material selected from the group consisting of polyolefins, styrene-olefin copolymers, phenolic resins, and mixtures thereof.

22. The structure of claim 18 wherein the softenable material has a softening range of breadth of at least about 10° C., and an initial softening point of less than about 90° C., and a surface melt viscosity capable of being controlled in the range of about $10^4$ to $10^9$ poise.

23. The structure of claim 16 wherein the softenable material comprises an organic amorphous glass.

References Cited

UNITED STATES PATENTS

| | | | |
|---|---|---|---|
| 2,909,443 | 10/1959 | Wolinski | 117—16 |
| 3,077,398 | 2/1963 | Jones | 96—1.8 |
| 3,079,253 | 2/1963 | Greig | 96—1.8 |
| 3,212,890 | 10/1965 | Kimble et al. | 96—1 |
| 3,318,697 | 5/1967 | Shrewsbury et al. | 96—1 |
| 2,552,209 | 5/1951 | Murray | 117—17.5 |
| 2,798,821 | 7/1957 | Lehmann | 117—215 X |
| 3,219,450 | 11/1965 | Goldberg | 96—67 |
| 3,279,920 | 10/1966 | Theodorou | 96—64 X |
| 3,317,315 | 5/1967 | Nicoli et al. | 96—1.1 |
| 3,520,681 | 7/1970 | Goffe | 96—1 |

FOREIGN PATENTS

| | | | |
|---|---|---|---|
| 990,538 | 4/1965 | Great Britain | 96—1 |

CHARLES E. VAN HORN, Primary Examiner

U.S. Cl. X.R.

117—218, 34